July 14, 1953  J. F. R. KARLSTROM  2,645,465
KITCHEN MIXING MACHINE
Filed March 26, 1951
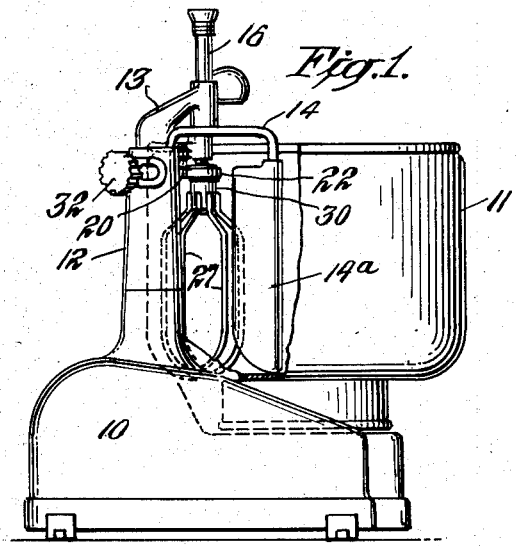
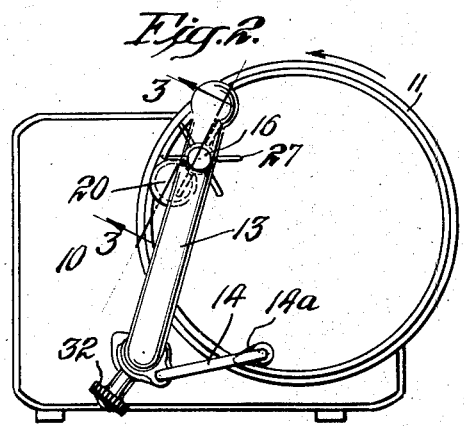
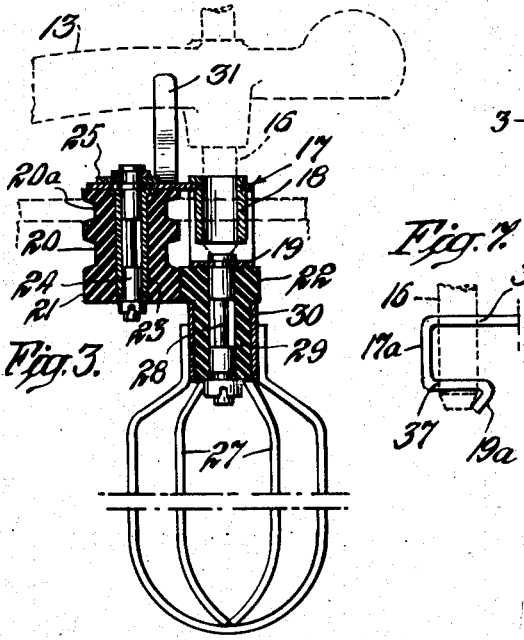
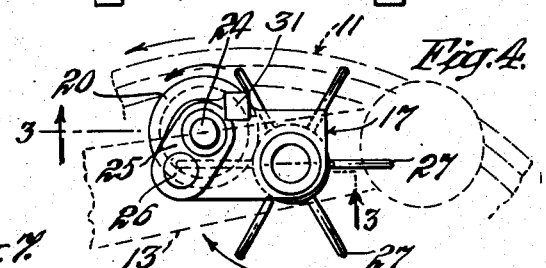
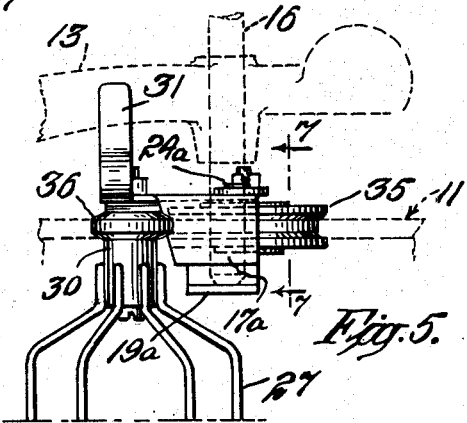
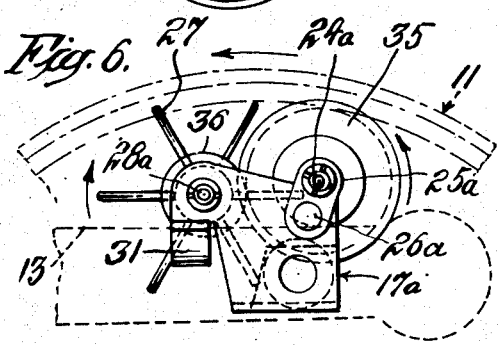
INVENTOR.
John Fredrick Robert Karlstrom
BY
Edmund A. Vexander
his ATTORNEY Patented July 14, 1953

2,645,465

UNITED STATES PATENT OFFICE 2,645,465

KITCHEN MIXING MACHINE

Johan Fredrik Robert Karlstrom, Stockholm, Sweden, assignor to Aktiebolaget Elektrolux, Stockholm, Sweden, a corporation of Sweden Application March 26, 1951, Serial No. 217,537
In Sweden November 22, 1947

11 Claims. (Cl. 259—85)

1

This invention relates to household appliances, and more particularly to an electrically operated kitchen appliance or device employed for mixing, stirring, beating, agitating or otherwise operating upon foods and similar materials.

In certain machines of this general character a receptacle or vessel, in which the beating, agitating or other treatment of the materials takes place, is rotatably supported for movement about a vertical axis. A beater or other rotatable agitating device may be disposed within such an open top receptacle or vessel and arranged to be rotated with the aid of a roller which frictionally engages the inner surface of the rotatable vessel. In the conventional arrangement just described and heretofore provided, the beater or agitator disposed within the vessel is caused to rotate in the same direction as the vessel.

It is an object of the present invention to provide an improvement in appliances of this type in which rotating movement is imparted to the beater or agitator in a direction which is opposite to the direction of rotation of the vessel, such rotating movement being transmitted to the beater or agitator from the rotatable vessel.

In accordance with the invention a beater, agitator, whipper or other rotatable tool, which is disposed within a vessel adapted to be driven by an electric motor, is arranged to be driven by a first rotatable member to which rotating movement is imparted by a second rotatable member arranged to be driven by the vessel. In this manner the beater or agitator is driven in a direction which is opposite to the direction of rotation of the vessel whereby improved mixing results are attained.

The above and other objects and advantages of the invention will be better understood from the following description taken in conjunction with the accompanying drawing forming a part of this specification, and in which:

Fig. 1 is a view in elevation of a household or kitchen appliance, partly broken away and in section, embodying the invention;

Fig. 2 is a top plan view of the appliance shown in Fig. 1;

Fig. 3 is an enlarged vertical sectional view, taken at line 3—3 of Figs. 2 and 4, to illustrate details more clearly;

Fig. 4 is an enlarged fragmentary top plan view of the details shown in Fig. 3;

Fig. 5 is a fragmentary view in elevation of a kitchen appliance illustrating another embodiment of the invention;

2

Fig. 6 is a top plan view of the details illustrated in Fig. 5; and

Fig. 7 is a fragmentary view taken at line 7—7 of Fig. 5.

Referring to the drawing, and particularly to Fig. 1 thereof, 10 designates the hollow base member or stand of a kitchen appliance of the type adapted for preparing food, such as by mixing, kneading and similar operations. An upright vessel or receptacle 11 is suitably mounted on the base 10 for rotation about a vertical axis. This may be accomplished, for example, by providing a vertical shaft projecting upwardly from the base 10 and to which the bottom of the vessel 11 may be detachably coupled, such shaft being driven in any suitable manner by an electric motor mounted within the hollow base 10. Such provisions for mounting and driving the vessel in the manner just described are well known in this art and are, therefore, not shown in detail herein. By way of example, the provisions for driving the vessel 11 may be of a type like that shown and described in United States Letters Patent No. 2,270,164 of G. Du Rietz and L. J. Faith-Ell, granted January 13, 1942.

Rising from the base member 10 and forming a part of the stand is a tubular standard or post 12 in which an arm 13 is mounted for angular movement about a vertical axis, so that a pin 16 vertically movable in the outer free end of the arm 13 may be positioned within the vessel 11. Suitable resilient biasing means desirably is employed to cause the arm 13 to move angularly in a direction outward and away from the center of the vessel 11 in order to maintain frictional contact between a driven member and a region at the inner surface of the vessel, in a manner to be described presently. In order to simplify the drawing the resilient means employed to impart angular movement to the arms 13 has not been shown, it being understood that such resilient biasing arrangements are well known. By way of example and without limitation, the resilient biasing provisions may be of a type like that shown and described in the aforesaid patent to Du Rietz and Faith-Ell, the disclosure of which may be considered as being incorporated in this application and to which reference may be made, if desired, for a detailed description of the kitchen appliance. The post or standard 12 also carries an angularly movable rod 14 at the outer free end of which a scraper blade 14a is carried which acts against the inner surface of the vessel 11 to scrape off material tending to adhere thereto.

The beating device in the form shown comprises a cage-like member 27 having the upper ends of the spaced apart elements thereof welded or otherwise secured to a bushing or sleeve 30 detachably fitted over the downwardly extending reduced diameter portion 29 of a roller 22. The detachable connection of the bushing 30 may be obtained by frictional coupling thereof on the rotatable part 29, thereby permitting removal of the beater for washing when desired. The roller 22, including the portion 29 integral therewith, is rotatable about a spindle 28 mounted in the lower portion 19 of a bracket or holder 17. Fixed in an apertured portion of the bracket 17 is a bushing or hollow sleeve 18 which is in alingment with the spindle 28 and arranged to receive the pin 16 when it is desired to couple the beater assembly to the arm 13.

Pivotally attached to the bracket 17 by a pin or rivet 26 is a link 25 to the outer free end of which is rigidly fixed a pin 24. Two rollers 20 and 21 are rigidly fixed to a bushing 23 which is rotatably mounted on the pin 24. The lower peripheral surface of roller 21 is adapted to be held in frictional engagement with the peripheral surface of the roller 22 and impart rotating movement to the latter. Adjacent to its upper end the roller 20 is formed with a groove 29a which is adapted to frictionally engage the inner portion of the rounded or beaded top edge of the vessel 11 whereby the latter during rotation imparts rotating movement to the roller 20. The rollers 20 and 21 may be formed integrally or formed from individual parts tightly held together on the bushing 23.

The bracket or holder 17 is provided with a stop member 31, as best seen in Figs. 3 and 4, which may be formed integrally therewith. When rotating movement is being transmitted to the beater 27 during the rotation of the vessel 11, the stop 31 is held against the arm 13 and resists the force tending to cause the holder or bracket 17 to turn on pin 16 in the same direction as the rotating or turning movement of the vessel 11. Accordingly, the stop 31 acts against the arm 13 to maintain the bracket or holder 17 in such a position on pin 16 that the beater or tool 27 is held away from the inner wall surface of the vessel and displaced toward the center of the vessel, as best seen in Fig. 4.

To place the kitchen tool just described in operation, the arm 13 is first manually swung toward the center of the vessel 11 against the tension of the resilient biasing provisions previously mentioned, and the arm may then be locked in such position by a knob 32 of a set-screw or locking member which passes through a slot formed in the post or standard 12. The beater assembly, which includes the bracket or holder 17, rollers 20 and 22, beater cage 27 and associated parts, is then positioned vertically in the vessel 11 with the bushing 18 located beneath and in axial alignment with the pin 16. The pin 16 is then manually moved downward so that the lower end thereof is received by the bushing 18, thereby coupling the beater assembly to the arm 13. The knob 32 is now turned to loosen the set-screw or locking member whereby the arm 13 and beater assembly coupled thereto is urged by the resilient biasing provisions toward the side wall of the vessel 11 and the groove 20a of roller 20 comes into frictional engagement with the inner surface of the rounded top portion of the vessel 11. By carrying the roller 20 at the outer free end of the angularly movable link 25, the latter moves angularly about the pivot at 26 after roller 20 engages the vessel 11 to cause the roller 21 to move in good frictional engagement with roller 22 and impart rotating movement thereto.

When the vessel 11 is being driven, the frictional engagement of the roller 20 therewith also imparts rotating movement to roller 21 in the same direction as the rotating movement of the vessel. The frictional engagement of the rollers 21 and 22 causes the roller 22 and beater 27 associated therewith to turn and rotate in a direction which is opposite to the direction of the turning movement of the vessel 11, thereby effecting an improved mixing or beating action.

In the embodiment of the invention disclosed in Figs. 5 to 7 in which parts similar to those shown and described in Figs. 1 to 4 are referred to by the same reference numerals, a roller 35 is mounted on a pin 24a and adapted to frictionally engage a region of the inner surface of the vessel 11. The roller 35 is formed with a peripheral edge having a groove which receives and frictionally engages a complementary shaped peripheral edge portion of a roller 36 mounted on a pin 28a upon which the beater unit is rotatably mounted. In the embodiment of Figs. 5 to 7 the bushing 18 shown in Figs. 1 to 4 is omitted and the lower end of the pin 16 extends downward through two coaxial openings 37 formed in overlying parts of the bracket or holder 17a, as best seen in Fig. 7. Moreover, the tab 19a formed at the lower end of the bracket 17a acts as a stop against which the lower end of the pin 16 rests. In the embodiment of Figs. 5 to 7 it will be noted the pin 16 is not in vertical alignment with the vertical axis of the beater unit or assembly as in the embodiment described above. In other respects the embodiment of Figs. 5 to 7 essentially corresponds to the embodiment shown in Figs. 1 to 4 inclusive and described above.

While the kitchen tool in the embodiments herein is in the form of a beater or whipping device, it will be apparent that any other form of mixing, stirring or agitating element may be employed. Accordingly, the term "beater" is intended to include any kitchen tool or appliance for use in kitchen or household appliance like that described herein.

In view of the foregoing it will now be understood that an improved arrangement has been provided for operating a kitchen tool in a vessel adapted to be driven by an electric motor, for example, the kitchen tool being driven in a direction opposite to the turning movement of the vessel. Further, such turning movement is transmitted to the kitchen tool with the aid of a rotatable element to which rotating movement is imparted only from the vessel and from which rotating movement is transmitted to a driven member associated with the kitchen tool. The bracket 17 in Figs. 1 to 4 and bracket 17a in Figs. 5 to 7 constitute supports for the kitchen tool which are formed to receive the lower end of the axially movable pin 16 which is disposed essentially parallel to the vertical axis of rotation of the vessel 11. The lower part 19 of the bracket 17 and tab portion 19a of the bracket 17a serve as stops to limit the extent of downward movement of the pin 16 and maintain the kitchen tool or beater assembly at the correct height.

Since the arm 13 is spring biased to urge the arm in an upward direction in Figs. 4 and 6, that is, cause the arm to move angularly through an arc toward the side wall of the vessel 11 when the knob 32 is loosened, it will be seen that the arm acts against the stops 31 which are located between the arm and the side wall of the vessel. Hence, the spring biased arm 13 urges the roller 20 in Figs. 1 to 4 and roller 35 in Figs. 5 to 7 in good frictional contact with the top rounded bead at the top edge of the vessel. The roller 20 is located at the outer end of a link 25 which is angularly movable about the pivot 26 while the roller 35 is located at the outer end of a link 25a angularly movable about the pivot 26a. The links 25 and 25a are located on the holders or supports 17 and 17a so that the friction movement developed during rotation effects the frictional engagement between rollers 21 and 22 in Figs. 1 to 4 and between rollers 35 and 36 in Figs. 5 to 7.

In the claims the terms "second friction roller" and "second roller" are employed to designate the single roller in Fig. 3 which serves as the roller 20 and also as the roller 21; and to designate the single roller 35 in Fig. 5. Since the rollers 20 and 21 in Fig. 3 may comprise separate roller elements or parts which are not necessarily united directly to one another, it is to be understood that the term "second friction roller" and any equivalent expression employed in the claims is intended to cover a single roller unit like that shown fixed to pin 24 in Fig. 3 and also several friction roller parts fixed to such a pin in which one roller part is adapted to frictionally engage the vessel and the other roller part is adapted to frictionally engage the roller for driving the beater cage 27.

While I have shown several embodiments of my invention, I do not wish to be limited to the particular constructions set forth, and I intend in the following claims to cover all changes and modifications which do not depart from the spirit and scope of my invention.

What is claimed is:

1. In combination with a food mixing machine or like device having a stand and an open top vessel which is adapted to be mounted for rotation on the stand about a vertical axis, such machine having provisions for driving the vessel, of a rotatable kitchen tool, a holder for said tool, structure for rotatably supporting said tool within the vessel including a pin carried by the stand which is substantially parallel to the axis about which the vessel rotates and upon which said holder is rotatably mounted, a driven member fixed to and rotatable with said tool, mechanism for operating said kitchen tool comprising a rotatable element to which rotating movement is imparted only from the vessel and from which rotating movement is transmitted to said driven member, means for supporting said driven member and rotatable element on said holder, and means including a part fixed to said holder and cooperating with the stand which prevents any tendency of said holder to turn on said pin in the direction of rotation of said vessel.

2. The combination set forth in claim 1 in which said supporting means for said rotatable element comprises structure which enables such element to be moved angularly with respect to said holder.

3. In combination with a food mixing machine or like device having a stand including an angularly movable arm and an open top vessel which is adapted to be mounted for rotation on the stand about a vertical axis, such machine having provisions for driving the vessel, of a rotatable kitchen tool, a holder for said tool, structure for rotatably supporting said tool within the vessel including a pin carried by said arm which is substantially parallel to the axis about which the vessel rotates and upon which said holder is rotatably supported, a driven member fixed to and rotatable with said tool, mechanism for operating said kitchen tool comprising a rotatable element to which rotating movement is imparted only from the vessel and from which rotating movement is transmitted to said driven member, means for supporting said driven member and rotatable element on said holder, and means including a part fixed to said holder and arranged to act against said arm to prevent any tendency of said holder to turn on said pin in the direction of rotation of the vessel.

4. In combination with a food mixing machine or like device having an open top vessel which is adapted to be mounted for rotation about a vertical axis, such machine having provisions for driving the vessel, of a unit comprising a rotatable kitchen tool, structure for supporting said unit within the vessel, said structure being operable to move said unit in a path of movement within the vessel, mechanism for operating said kitchen tool, said mechanism including a driven member carried by said unit for driving said tool, a part carried by said unit and movable thereon, and an element mounted on said part for rotation thereon, said part being positioned on said unit to cause said rotatable element to transmit rotating movement to said driven member when rotating movement is imparted to said element from the vessel upon movement of said unit in one direction in its path of movement within the vessel.

5. In combination with a food mixing machine or like device having an open top vessel which is adapted to be mounted for rotation about a vertical axis, such machine having means for positively driving the vessel, of a unit comprising a rotatable kitchen tool, structure for supporting said unit within the vessel for movement about a vertical axis, said structure being operable to move said unit bodily in a path of movement within the vessel, mechanism for operating said kitchen tool, said mechanism including a first friction roller carried by said unit for driving said tool, a part carried by said unit and movable thereon, and a second friction roller mounted on said part for rotation thereon, said part being positioned on said unit to cause said second roller to frictionally engage said first roller when said second roller is brought into frictional engagement with the vessel upon movement of said unit in one direction in its path of movement within the vessel.

6. In combination with a food mixing machine or like device having an open top vessel which is adapted to be mounted for rotation about a vertical axis, such machine having means for positively driving the vessel, of a unit comprising a rotatable kitchen tool, structure for rotatably supporting said unit within the vessel, said structure comprising a member rotatable about a vertical axis disposed exteriorly of the vessel for moving said unit bodily in a path of movement within the vessel, mechanism for operating said kitchen tool, said mechanism including a first friction roller carried by said unit which is fixed to and rotatable with said tool, a part pivoted on said unit and movable thereon, and a second friction roller mounted on said part for rotation thereon, said part being pivoted on said unit to cause said second roller to frictionally engage said first roller when said second roller is brought into frictional engagement with the vessel upon movement of said unit in one direction in its path of movement within the vessel.

7. In combination with a food mixing machine or like device having an open top vessel which is adapted to be mounted for rotation about a vertical axis, such machine having means for positively driving the vessel, of a kitchen tool, such as a beater, for example, supporting means for positioning such tool in the vessel, said supporting means being operable to move said tool bodily in one direction in an arcuate path of movement toward an upright wall of the vessel, mechanism for operating said tool, said mechanism including a first rotatable member on said supporting means for driving said tool, a part on said supporting means which is movable thereon, and a second rotatable member mounted on said part for rotation thereon, said part being positioned on said supporting means to cause said second rotatable member to transmit rotating movement to said first rotatable member for driving said tool when rotating movement is imparted to said second rotatable member from the vessel upon movement of said tool in said one direction toward the upright wall of the vessel.

8. In combination with a food mixing machine or like device having an open top vessel which is adapted to be mounted for rotation about a vertical axis, such machine having means for positively driving the vessel, of a kitchen tool, such as a beater, for example, supporting means for positioning such tool in the vessel, said supporting means including provisions for moving said tool in a path of movement within the vessel, said supporting means comprising a holder for carrying said tool, mechanism for operating said tool, said mechanism including a first rotatable element for driving said tool, said first rotatable element being mounted for rotation on said holder about a fixed axis thereon, a second rotatable element, and means for mounting said second rotatable element on said holder for rotation about an axis movable with respect to said holder, said last-mentioned mounting means being operable to cause said second rotatable element to transmit rotating movement to said first rotatable element to drive said tool when rotating movement is imparted to said second rotatable element from the vessel upon movement of said tool in one direction in its path of movement within the vessel.

9. In combination with a food mixing machine or like device having an open top vessel which is adapted to be mounted for rotation about a vertical axis, such machine having means for positively driving the vessel, of a rotatable kitchen tool including a holder, structure cooperating with said holder for rotatably supporting said tool within the vessel, such structure enabling said tool to be moved angularly through an arc in a path of movement toward and from the upright wall of the vessel, a first friction roller carried by said holder which is fixed to and rotatable with said tool, mechanism separate from the driving means for the vessel for operating said kitchen tool, said mechanism comprising an element pivoted on said holder and a second friction roller rotatably mounted on such element which is arranged to frictionally engage the vessel and said first friction roller in one position of said tool in its path of movement, said second roller being out of frictional contact with the vessel in another position of said tool in its path of movement while the driving means is still operable to drive the vessel, said element being positioned on said holder to cause said second friction roller to frictionally engage said first roller when said second roller is brought into frictional engagement with the vessel upon movement of said tool to said one position in its path of movement.

10. In combination with a food mixing machine or like device having an open top vessel which is adapted to be mounted for rotation about a vertical axis, such machine having provisions for driving the vessel, a part rotatable about a vertical axis disposed exteriorly of the vessel, such part being angularly movable with respect to the vessel at the vicinity of the opening thereof, and an upright pin which is vertically movable on the part and in its lower position extends into the interior of the vessel when the part is disposed above the vessel, of unitary structure comprising a holder and a rotatable kitchen tool journaled for rotation on said holder, means including said holder for removably supporting said structure on the pin to position the latter within the vessel, and said holder being apertured to receive the lower end of the pin and having a stop to limit downward vertical movement thereof, said holder having one part thereof employed to journal said kitchen tool and another part thereof formed to receive the pin.

11. The combination set forth in claim 10 in which said holder includes a hollow sleeve member to provide the aperture which receives the pin, said sleeve member being located above said stop.

JOHAN FREDRIK ROBERT KARLSTROM.

References Cited in the file of this patent

UNITED STATES PATENTS

| Number | Name | Date |
|---|---|---|
| 1,714,359 | Gambon | May 21, 1929 |
| 1,898,986 | Fitzgerald | Feb. 21, 1933 |
| 2,270,164 | Du Rietz et al. | Jan. 13, 1942 |